United States Patent

Miller, II et al.

[11] Patent Number: 5,845,461
[45] Date of Patent: Dec. 8, 1998

[54] METHOD AND APPARATUS FOR FILLING AND SEALING AN INFLATOR FOR AN AUTOMOTIVE AIRBAG MODULE

[76] Inventors: Harry W. Miller, II, 4981 Partridge Way, Ogden, Utah 84403; Richard W. Kirby, 583 W. 385 North, Pleasant View, Utah 84414; Gregory J. Lang, 5052 S. 1075 East, South Ogden; Don T. Jensen, 5829 N. Highland Cove, Mt. Green, both of Utah 84403

[21] Appl. No.: 634,043

[22] Filed: Apr. 17, 1996

[51] Int. Cl.⁶ ........................................ B65B 31/00
[52] U.S. Cl. ........................ 53/403; 53/79; 53/80; 53/404; 141/3; 141/197
[58] Field of Search ................ 53/403, 404, 409, 53/274, 79, 80, 83, 90, 91, 92; 141/DIG. 1, 3, 18, 197

[56] References Cited

U.S. PATENT DOCUMENTS

| | | |
|---|---|---|
| 586,633 | 7/1897 | Sterne . |
| 1,726,766 | 9/1929 | Rector . |
| 2,412,167 | 12/1946 | Minaker .................................... 226/82 |
| 2,780,043 | 2/1957 | Hensgen ................................... 53/112 |
| 2,831,301 | 4/1958 | Martell ....................................... 53/79 |
| 3,538,670 | 11/1970 | Morgan ...................................... 53/83 |
| 3,577,696 | 5/1971 | Bock et al. ................................... 53/7 |
| 3,673,762 | 7/1972 | Bock et al. .................................. 53/86 |
| 3,924,382 | 12/1975 | Overkott ...................................... 53/7 |
| 3,983,678 | 10/1976 | Bogler et al. ............................. 53/403 |
| 4,437,290 | 3/1984 | Marchadour ............................... 53/97 |
| 4,712,353 | 12/1987 | Bethell et al. .............................. 53/80 |
| 5,228,269 | 7/1993 | Sanfilippo et al. ...................... 53/403 |
| 5,424,509 | 6/1995 | Schaugaard et al. ............... 219/137 R |
| 5,524,871 | 6/1996 | Muller et al. ............................. 53/403 |

Primary Examiner—James F. Coan
Assistant Examiner—Gene L. Kim

[57] ABSTRACT

An inflator having a base containing a diffuser and a canister having a chamber for receiving and holding gas under pressure are inserted in aligned, separated position in a pressure chamber. The pressure chamber is closed, sealed and filled with gas, thereby filling the canister. When the gas fill reaches the desired pressure, an integral top press is activated, thereby joining the base with the filled inflator canister. The base is then welded or crimped to the inflator chamber, thereby assembling a complete airbag inflating device.

11 Claims, 2 Drawing Sheets

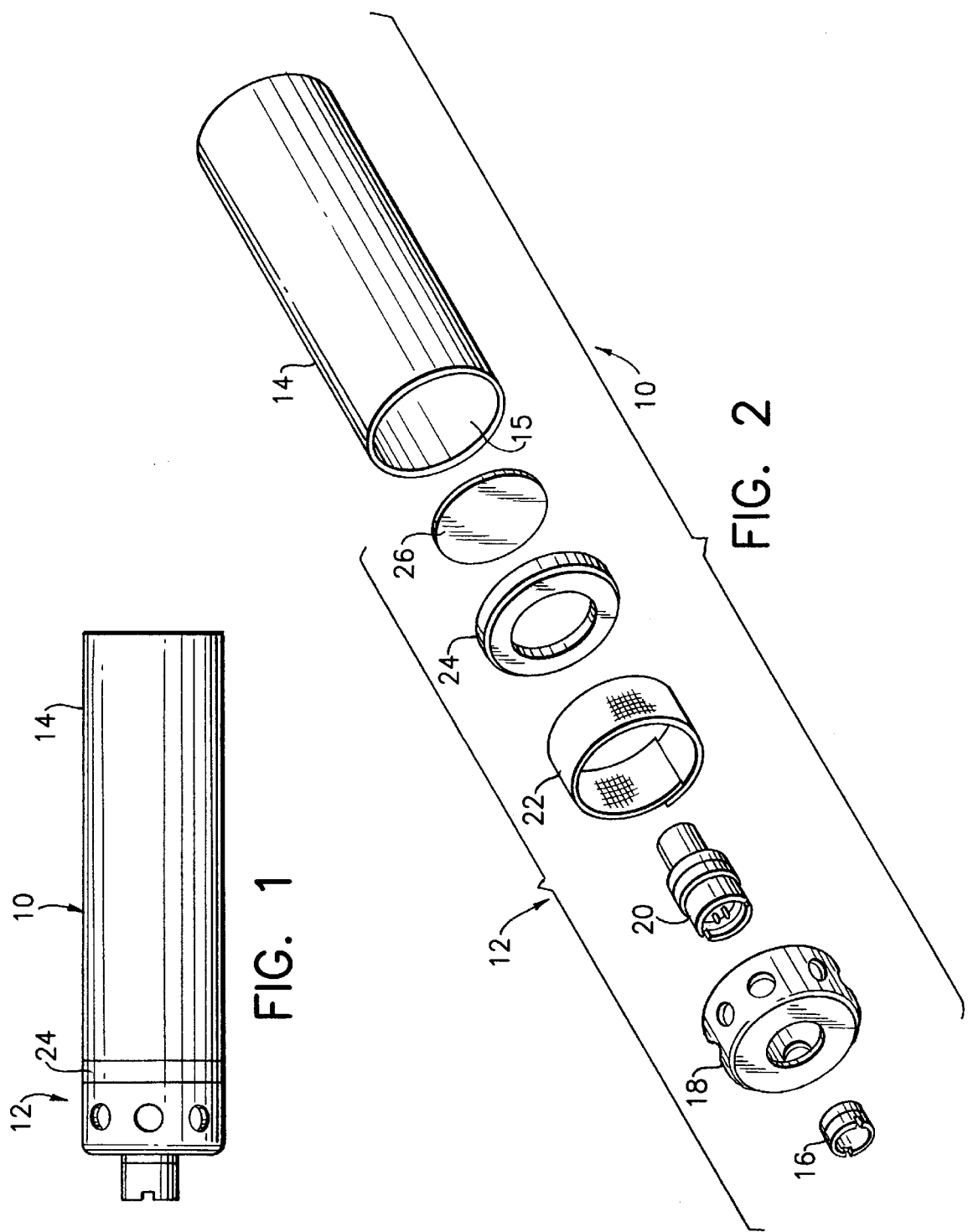

METHOD AND APPARATUS FOR FILLING AND SEALING AN INFLATOR FOR AN AUTOMOTIVE AIRBAG MODULE

FIELD OF THE INVENTION

This invention relates to a method and apparatus for fabricating airbag inflators, and more particularly to the gas filling, assembly and sealing of airbag inflators using a single apparatus.

BACKGROUND OF THE INVENTION

Airbag modules employ inflators which house a highly pressurized inert gas. The inflator, when ignited in a vehicular collision, releases the stored pressurized gas into a folded airbag in the module for inflation and deployment of the airbag into the vehicle.

Airbag inflators normally provide a small opening which is employed as a fill port for the injection of the gas. During one stage of the inflator assembly, a prescribed amount of pressurized gas is provided in an area designed to contain the gas along with the inflator. Such a gas fill method is time-consuming and difficult to control with respect to weight and pressure. In addition, the fill hole must be sealed after the inflator is filled to the desired pressure. One method of closing the fill hole is disclosed, e.g., in U.S. Pat. No. 5,196,669 assigned to RWC Inc. A ball is deposited in the mouth of the gas fill opening in the inflator and is subjected to resistance welding by moving a retracted welding electrode of the machine into an extended welding position into contact with the ball. A welding current is applied to the welding electrode to weld the ball in the fill hole, thereby sealing the same and thereafter retracting the welding electrode and resetting the ball delivery system for the next inflator sealing operation.

The cost of sealing and welding the fill port and assuring a uniform weld or closure contributes to the added cost of the inflator. Under the aforesaid procedure, the inflator must first be assembled by welding the end closure (base/diffuser) to the inflator chamber (canister) and providing a fill port therein and then moving the inflator to a gas filling, sealing and welding machine, which also is time-consuming and requires additional costly machinery.

SUMMARY OF THE INVENTION

Accordingly, it is an object of this invention to provide a new and improved method and apparatus for assembling, filling and sealing inflators for airbag assemblies.

Another object of the invention is to provide a new and improved apparatus and method for fabricating pressurized gas filled inflators which is performed in a continuous manner on a single machine.

Still another object of this invention is to provide a new and improved method of fabricating inflators for airbag modules which eliminates drilling a small fill hole in an inflator and provides a simplified cost effective gas fill method.

Yet another object of the present invention is to provide a new and improved method for fabricating inflators for airbag modules which is cost effective with respect to production equipment, inflator fabrication; floor space and manpower.

In carrying out this invention in one illustrative embodiment thereof, an apparatus is provided for filling and sealing pressurized gas in an airbag inflator of the type having a base and a canister with a gas fill chamber which are joined after the canister is filled with gas. A housing is provided having a gas fill port and upper and lower fill chambers which have means for moving the chambers relative to each other. Means is provided for holding the base in the upper fill chamber separated from the canister positioned in the lower fill chamber. Means is provided for sealingly engaging the upper chamber and the lower chamber and supplying pressured gas thereto, which also fills the canister with pressurized gas. The base and gas filled canister are joined with the base being sealably mounted on the canister, thereby assembling, gas filling, and sealing the inflator in a single apparatus.

BRIEF DESCRIPTION OF THE DRAWINGS

The invention together with further objects, features, aspects and advantages thereof may be more fully understood from the following description taken in connection with the accompanying drawings.

FIG. 1 is a view of an assembled inflator in accordance with the present invention;

FIG. 2 is an exploded, perspective view of the inflator of FIG. 1;

DESCRIPTION OF THE PREFERRED EMBODIMENTS

Figure 3:
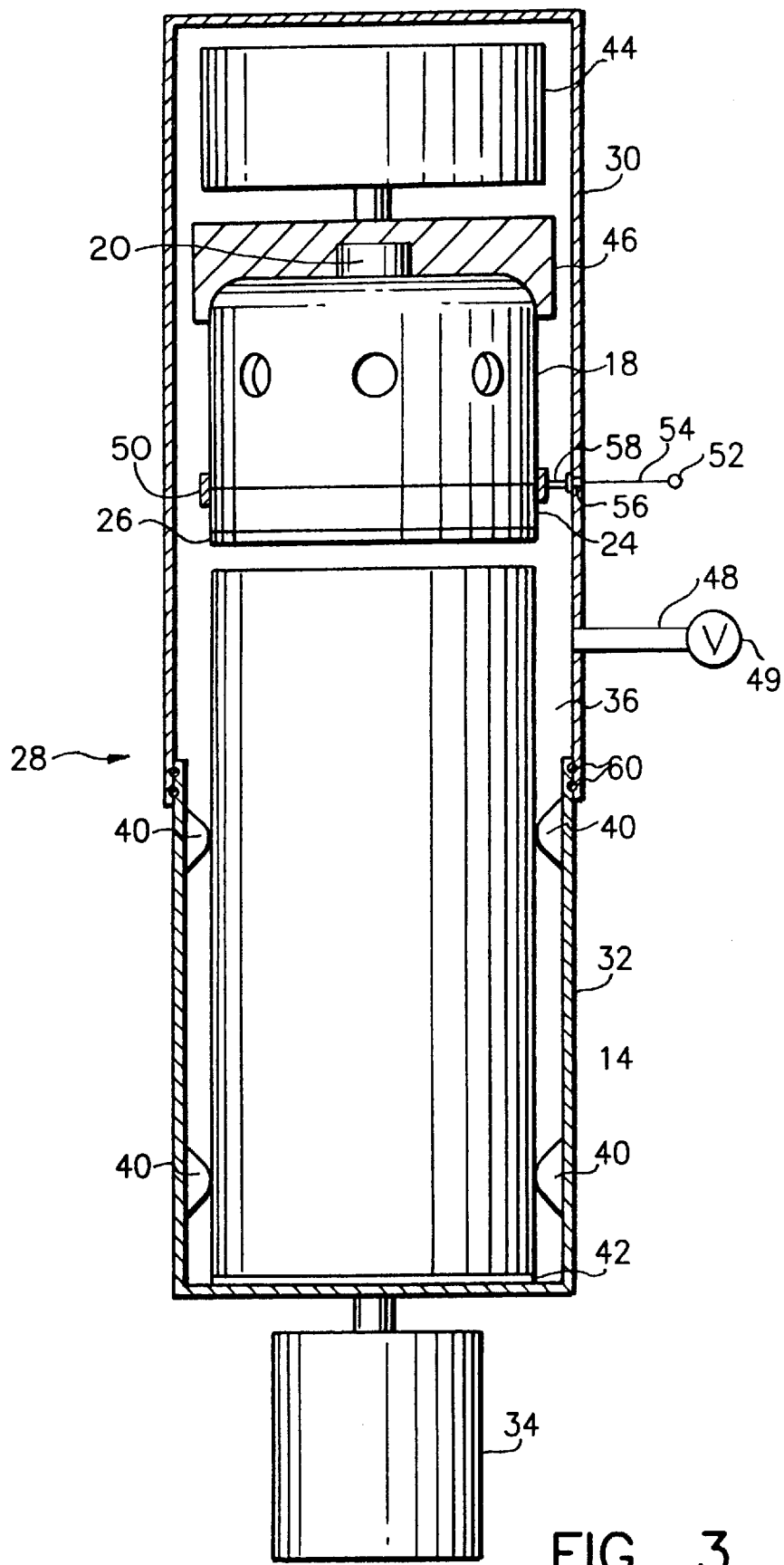
FIG. 3 is a diagrammatic elevation view, partly in section, illustrating the apparatus employed in fabricating the pressurized gas filled inflator of FIG. 1.

Referring now to FIG. 1, an assembled pressurized gas filled inflator, referred to generally with the reference numeral 10, comprises a base 12 and a canister 14. As will best be seen in FIG. 2, the base 12 includes a shortening clip 16, a diffuser 18, an initiator 20, a diffuser screen 22, a weld ring 24 and a burst disk 26. The canister portion 14 of the inflator 10 has an inflator chamber 15 therein. The base or closure 12 is joined to the canister 14 by the weld ring 24 as shown in FIG. 1 in a manner described hereinafter.

FIG. 3 shows diagrammatically an apparatus for the assembling, filling and sealing the inflator 10 of FIGS. 1 and 2. The apparatus of FIG. 3 comprises a housing 28 having an upper fill/weld chamber 30 and a lower fill chamber 32 forming an inflator chamber 36 therein when closed. A lower cylinder 34 is connected to the lower chamber 32 for moving the lower chamber 32 down to open the housing 28 for loading the base assembly 12 and the canister 14 in the housing 28. The lower fill chamber 32 has a plurality of canister locators 40 therein for properly positioning and aligning the canister 14 therein and a grounding plate 42 on the bottom thereof on which the canister 14 sits when positioned in the lower chamber 32.

The upper chamber 30 contains a top press cylinder 44 coupled to a magnet and base press 46. The magnet and base press 46 hold the base assembly 12, i.e., its constituent parts, the shortening clip 16, diffuser 18, initiator 20, weld ring 24 and burst disk 26 in place in the upper chamber 30 in alignment with a canister 14 separated from the base 12 and positioned in the lower chamber 32. As an alternative structure, the magnet could be replaced by a clamping mechanism for holding the base assembly in place. A circular welding electrode 50 is mounted in the upper chamber 30 to which an electrical source 52 is applied via electrical leads 54 through an embedded insulated electrical contact terminal 56 in the wall of the upper chamber 30. A wiper or sliding contact 58 coupled between the terminal 56 and welding electrode 50 applies the electrical source 52 to the welding electrode 50. As an alternative structure, the electrode could be included in the base press 46.

The inflator chamber 36 is pressure sealed upon the housing 28 closure by a double row of "0" ring seals 60 in the inner wall of the upper chamber 30 that mate with the outer wall of the lower chamber 32.

In operation, the cylinder 34 is activated for moving the lower chamber 32 of the housing 28 down to open the housing 28. The base assembly 12 is then loaded in the upper chamber 30 and held in position therein by the magnet and base press 46. Then the canister 14 is inserted in the lower chamber 32 being precisely located therein by the canister locators 40. After loading, the housing 28 and thus the inflator chamber 36 are then closed by activation of the lower cylinder 34 which is pressure sealed by the double "0" ring seals 60.

At the time of closure of the housing 28, the base assembly 12 held by the magnet and base press 46 and the canister 14 are initially separated by approximately ⅛ to ¼ of an inch. As soon as the inflator chamber 36 is closed and sealed, gas valve 49 is opened, allowing inert gas to flow into the inflator chamber 36 through the gas fill port 48. The ⅛ to ¼ inch separation between the base assembly 12 and the canister 14 allows the gas to not only rapidly fill the inflator chamber 36 but at the same time and same rate to fill the inflator canister 14 to the same pressure. When the gas fill reaches a predetermined pressure and weight requirement in the inflator chamber 36, the top press cylinder 44 is activated, placing a predetermined pressure on the magnet and base press 46 which in turn places a predetermined required pressure on the base assembly 12 and canister 14 which join under the pressure. The joined components, i.e., the base assembly 12 and canister 14 are welded or crimped together, thereby forming a complete pressure filled airbag inflator 10. One method of welding illustrated in FIG. 3 is capacitor discharge (CD) welding employing a welding electrode 50. When the base assembly 12 and canister 14 are joined under heavy pressure, the welding electrode is positioned contacting the base 12. A low voltage pulse applied from the electrical source 52 to the welding electrode 50 is released through the joined base assembly 12 and canister 14, and a fine grain diffusion bond is formed therebetween. The canister 14 is grounded by the grounding plate 42 in the bottom of the lower chamber 32. Welding occurs in approximately 4 to 15 milliseconds with very low localized heat. Alternatively, the canister or base assembly may have flanges or other peripheral surfaces which are crimped and sealed when the top press cylinder is activated to forcibly bring the base assembly 12 and canister 14 together. After the weld or crimp is completed, the machine is opened and the completed inflator is removed.

The described method and apparatus thus eliminates trying to fill an inflator through a small opening or fill port, which is time-consuming and difficult to control with respect to weight and pressure. The fill port contributes to the cost since a precise fill port is required which necessitates a separate manufacturing operation on a different fixture in addition to the cost of subsequent sealing and welding of the fill port. Also, the end closure must be welded on the canister on a separate machine with the completed assembly transported to another machine for filling, sealing and welding of the fill port. In accordance with the present invention the gas filling of the canister and the welding of the base assembly or closure on the canister are combined in one continuous operation on a single machine.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What we claim is:

1. An apparatus for filling and sealing pressurized gas in an airbag inflator having a separated base and a canister which are joined after the canister is filled with gas in said apparatus, said apparatus comprising:

a housing containing a gas fill port and having upper and lower fill chambers, first means for moving said upper and lower fill chambers relative to each other, means for positioning said canister of said airbag inflator in said lower fill chamber of said housing on an electrical grounding plate end wall of said lower fill chamber, means for holding said base in said upper fill chamber separated from said canister in said lower fill chamber, means for sealingly engaging said upper chamber on said lower chamber of said housing with said base spaced from said canister, means for filling said housing with pressurized gas through said fill port in said housing, thereby filling said canister with said pressurized gas, second means for bringing said base and said filled canister together under force, and means for sealably mounting said base on said canister for assembling a completely sealed airbag inflator in said apparatus, said means comprising a circular welding electrode inside said upper fill chamber surrounding and being in contact with an exterior of the base, and an electrical source for supplying an electrical current to said circular welding electrode for bonding said base on said canister in said housing filled with pressurized gas.

2. The apparatus as claimed in claim 1 wherein said first means comprises a lower cylinder.

3. The apparatus as claimed in claim 1 wherein said means for holding said base in said upper fill chamber comprises a magnet and base press.

4. The apparatus as claimed in claim 1 wherein said means for positioning said canister in said lower fill chamber comprises a plurality of spaced canister locators in said lower fill chamber of said housing.

5. The apparatus as claimed in claim 1 wherein said means for sealingly engaging said upper chamber on said lower chamber comprises O-ring sealing means.

6. The apparatus as claimed in claim 1 wherein said second means comprises a top press cylinder.

7. A method for filling with gas and sealing an airbag inflator having a base and a canister which are joined after the canister is filled with gas by said method, comprising the steps of:

providing an inflator chamber housing containing a gas fill port having upper and lower fill chambers, said upper fill chamber having a circular welding electrode therein, moving said upper and lower fill chambers relative to each other to open said inflator chamber housing, positioning said canister of said airbag inflator in the lower fill chamber on an electrical grounding plate end wall of said lower fill chamber of said inflator housing, holding said base in said upper fill chamber separated from said canister in said lower fill chamber, closing said inflator chamber housing, filling said inflator chamber with pressurized gas through said fill port in said inflator chamber, thereby filling said canister with said pressurized gas, moving said base and said filled canister together under force with the circular welding electrode inside said upper fill chamber surrounding and being in contact with an exterior of said base, and sealably mounting said base on said canister by providing a source of electrical current to said welding electrode inside the upper fill chamber for welding said base on said canister, thereby assembling a completely sealed airbag inflator within said inflating chamber housing filled with pressurized gas.

8. The method as claimed in claim 7 wherein closing the inflator chamber brings said base in said upper fill chamber to a position approximately ⅛ to ¼ inches from said canister in said lower fill chamber.

9. The apparatus as claimed in claim 3 wherein said second means comprises a top press cylinder coupled to said magnet and base press.

10. The apparatus as claimed in claim 7 wherein said base is brought together with said canister by activation of a press cylinder.

11. An apparatus for filling and sealing pressurized gas in an airbag inflator having separated base and canister which are joined after the canister is filled with gas in said apparatus, said apparatus comprising:

a housing containing a gas fill port and having upper and lower gas fill chambers, a first cylinder for opening and closing said housing, canister locator means in said lower fill chamber for positioning said canister in said lower fill chamber on an electrical grounding plate end wall of said lower fill chamber, a magnet and base press for holding said base in said upper fill chamber separated from said canister in said lower fill chamber, means for sealingly positioning said upper chamber on said lower chamber of said housing with said base separated from said canister when said first cylinder is actuated, means for filling said housing with pressurized gas through said fill port, thereby filling said canister with said pressurized gas, second cylinder means coupled to said magnet and base press for forcefully bringing said base in contact with said filled canister, and means for sealably mounting said base on said canister, for assembling a completely sealed airbag inflator in said apparatus, said means comprising a circular welding electrode inside said upper fill chamber surrounding and being in contact with an exterior of the base, and an electrical source for supplying an electrical current to said welding electrode for bonding said base on said canister in said housing filled with pressurized gas.

* * * * *